(12) United States Patent
Rebsdorf et al.

(10) Patent No.: US 9,109,581 B2
(45) Date of Patent: Aug. 18, 2015

(54) OFFSHORE WIND TURBINE HAVING A SUPPORT SYSTEM FOR INTERCHANGEABLE CONTAINERS, THE SUPPORT SYSTEM BEING COMBINED WITH A WAVE RUN-UP DEFLECTOR AND METHOD OF MANUFACTURING SAME

(75) Inventors: Anders Varming Rebsdorf, Skanderborg (DK); Soeren Staugaard, Vildbjerg (DK)

(73) Assignee: Envision Energy (Denmark) ApS, Silkeborg (DK)

( * ) Notice: Subject to any disclaimer, the term of this patent is extended or adjusted under 35 U.S.C. 154(b) by 683 days.

(21) Appl. No.: 13/444,152

(22) Filed: Apr. 11, 2012

(65) Prior Publication Data

US 2012/0257973 A1 Oct. 11, 2012

(30) Foreign Application Priority Data

Apr. 11, 2011 (DK) .................................. 2011 70169

(51) Int. Cl.
*F03D 11/00* (2006.01)
*F03D 11/04* (2006.01)

(52) U.S. Cl.
CPC ................ *F03D 11/04* (2013.01); *F03D 11/00* (2013.01); *F05B 2240/142* (2013.01); *F05B 2240/912* (2013.01); *F05B 2240/913* (2013.01); *F05B 2240/95* (2013.01); *Y02E 10/727* (2013.01); *Y02E 10/728* (2013.01)

(58) Field of Classification Search
CPC ................................................ F05B 2240/913
USPC ........... 290/44, 55; 405/203, 204; 416/146 R, 416/244 R; 52/40, 300, 301, 745.04
See application file for complete search history.

(56) References Cited

U.S. PATENT DOCUMENTS

| 3,624,702 A | * | 11/1971 | Meheen ........................ 405/227 |
| 6,750,559 B2 | | 6/2004 | Becker |
| 6,827,032 B1 | * | 12/2004 | Wobben ...................... 114/230.1 |

(Continued)

FOREIGN PATENT DOCUMENTS

| CN | 1377319 A | 10/2002 |
| CN | 101109359 A | 1/2008 |

(Continued)

OTHER PUBLICATIONS

Machine translation of DE102004033681 (Feb. 9, 2006) from EPO.*

(Continued)

*Primary Examiner* — Edward Look
*Assistant Examiner* — Christopher R Legendre
(74) *Attorney, Agent, or Firm* — Roberts Mlotkowski Safran & Cole, P.C.; David S. Safran (57) ABSTRACT

An offshore wind turbine comprising a tower, where said wind turbine at a level above sea level comprises at least one structure for storing at least one container, said container having the size and measures of a standard container, where said structure is arranged on the side of the tower, and a method of manufacturing such a concrete structure for an offshore wind turbine. The structure for storing one or more containers includes a deck, and at least one bed for supporting at least one container along the container's lower surface and/or edges, where the structure is a concrete structure. By manufacturing the structure from concrete, a very robust and strong structure is achieved.

13 Claims, 8 Drawing Sheets

(56) References Cited

U.S. PATENT DOCUMENTS

| | | | |
|---|---|---|---|
| 7,530,780 B2 * | 5/2009 | Kothnur et al. | 415/4.3 |
| 7,802,961 B2 * | 9/2010 | Grabau | 415/4.3 |
| 2006/0185279 A1 | 8/2006 | Eusterbarkey | |
| 2008/0040983 A1 * | 2/2008 | Fernandez Gomez et al. | 52/40 |
| 2012/0257973 A1 * | 10/2012 | Rebsdorf et al. | 416/146 R |

FOREIGN PATENT DOCUMENTS

| | | |
|---|---|---|
| CN | 101124402 A | 2/2008 |
| CN | 201545179 U | 8/2010 |
| CN | 201785765 U | 4/2011 |
| DE | 102004033681 A1 * | 2/2006 |
| DE | 100 21 163 B4 | 3/2006 |
| EP | 1 240 426 B1 | 9/2004 |
| EP | 2 011 924 A2 | 1/2009 |
| EP | 2551233 A1 * | 1/2013 |
| FR | 2 887 900 A1 | 1/2007 |

OTHER PUBLICATIONS

Machine translation of EP1240426 (Sep. 29, 2004) from EPO.*
Machine translation of EP2011924 (Jan. 7, 2009) from EPO.*

* cited by examiner

OFFSHORE WIND TURBINE HAVING A SUPPORT SYSTEM FOR INTERCHANGEABLE CONTAINERS, THE SUPPORT SYSTEM BEING COMBINED WITH A WAVE RUN-UP DEFLECTOR AND METHOD OF MANUFACTURING SAME

BACKGROUND OF THE INVENTION

1. Field of the Invention

The present invention relates to an offshore wind turbine comprising a tower, where a nacelle is arranged on top of said tower, said nacelle comprising a rotor with at least two rotor blades, said wind turbine further comprising subsystems for controlling the wind turbine, for converting and transforming the power generated by the wind turbine and for connecting the wind turbine to the overall electrical grid, said tower being connected to a transition piece or a foundation at a lower end, said connection being at a position above sea level, where said wind turbine at a level above sea level comprises at least one structure for storing at least one container, said container having the size and measures of a standard container and containing at least some of said subsystems for converting and transforming power generated by the wind turbine, where said structure is arranged on the side of the tower. The invention further comprises a method of manufacturing such a concrete structure for an offshore wind turbine.

2. Description of Related Art

It is well known that wind turbines now and then have to be repaired or that specific parts have to be changed. Many of the mechanical and also electrical parts are housed in the nacelle on top of the tower of the wind turbine. Ever since the wind turbines have been installed offshore there have been attempts to figure out a suitable way of hoisting equipment to and from the nacelle. This is a need seeing as there is a demand for a quick exchange of parts as the sea has to be pretty calm in order to be able to unload or load parts from a ship to or from a wind turbine.

This can, e.g., be done with a build-in hoist in the nacelle. The hoist can be used to lift parts from a ship to the nacelle, where the parts can be installed. From U.S. Pat. No. 6,750, 559 B2 it is known to install a movable container underneath the nacelle, where said container is used for receiving and storing parts for the wind turbine. This solution features a build-in hoist in the nacelle.

Another known method is described in European Patent Application EP 1 240 426 B1, where some of the vital electrical components are arranged in a pair of containers on the side of the wind turbine tower and in a position well above sea level. In EP 1 240 426 B1 there is described a solution where standard containers via hoisting equipment on the tower are hoisted from a ship to a position underneath a protective cladding. In this solution there is provided access from the tower to the container and vice versa via a connecting channel comprising suitable sealing means. Access to the container is made possible via an opening in the sidewall of the container. In one of the described embodiments in EP 1 240 426 B1 the containers are hoisted to a position underneath the protective cladding and are subsequently displaced in a sideward direction against the tower and into a more closed shed, thus protecting the container and the connection between the tower and the container against the elements.

In European Patent Application EP 1 240 426 B1 as in the other known solutions, one or two containers are positioned underneath a support structure and are left hanging from said structure, while mounted to the wind turbine. A considerable drawback in such solutions is that the containers have to be accessed by installations, e.g., cables and/or personnel via corresponding openings in the sidewall of the wind turbine tower and of the container. Such openings have to be as small as possible as every opening in the structure weakens the strength in the tower. As the openings have to be very small and as space is rather limited, this is not the optimum solution. Further, it is quite a challenge to obtain a sealing between the hanging container and the tower that is sufficiently waterproof.

Another problem regarding offshore wind turbines is that they generally are subjected to more extreme environmental conditions than conventional onshore turbines, e.g., typhoon- or hurricane-type conditions including large waves. Wave run-up is a phenomenon wherein waves encountering a surface above the water level, e.g., the cylindrical surface of a wind turbine tower, will rise vertically along the surface to a maximum run-up height. In extreme wave conditions, such wave run-up may reach a height of 25 meters above normal sea level. Such potential run-up heights force wind turbine designers to increase height clearances for wind turbines above sea level to prevent any potential damage caused to rotor blades or to electrical systems provided at the exterior of the tower surface by such large run-ups.

European Patent Application EP 1 240 426 B1 describes a system wherein electrical subsystems such as switchgears or transformers are housed in containers suspended on the exterior of the wind turbine tower, a housing provided about the containers. However, such a housing only provides partial protection from the elements, and does not account for the damage which may be caused by wave run-up, wherein waves may impact on the wind turbine tower and on the containers from any possible angle and direction.

From European Patent Application EP 2 011 924 A2 a transition piece and a platform for a wind turbine, made from concrete, is known. The platform is resting on a recess at the top of the transition piece which is arranged on top of a monopile foundation. The tower of the wind turbine is fastened at the upper end of the transition piece. The platform disclosed in European Patent Application EP 2 011 924 A2 is a work platform used by workers when entering and leaving the wind turbine. No technical installations are situated on this platform and the reason for manufacturing said transition piece and platform in concrete is to avoid problem with corrosion. Further there is not arranged any beds for accommodation of containers comprising various electrical equipment for controlling the wind turbine.

SUMMARY OF THE INVENTION

It is an object of the invention to provide a solution where a wind turbine comprises a structure for receiving and supporting one or more containers, where one or more containers can be installed in connection with a wind turbine, where a container can be interchanged if needed, and where the container is accessible from the outside. It is a further object of the invention to provide a solution for an offshore wind turbine having adequate protection from wave run-up.

As mentioned above the invention relates to an offshore wind turbine comprising a tower, where a nacelle is arranged on top of said tower, said nacelle comprising a rotor with at least two rotor blades, said wind turbine further comprising subsystems for controlling the wind turbine, for converting and transforming the power generated by the wind turbine and for connecting the wind turbine to the overall electrical grid, said tower being connected to a transition piece or a foundation at a lower end, said connection being at a position above sea level, where said wind turbine at a level above sea level comprises at least one structure for storing at least one container, said container having the size and measures of a standard container and containing at least some of said subsystems for converting and transforming power generated by the wind turbine, where said structure is arranged on the side of the tower.

By the expression "standard container" it is meant: a container having the size and measures of a traditional shipping container, which typically is used for sea and land transport, and which is possible to handle with common lifting equipment such as cranes and forklifts. A standard container is so to speak a standardized unit that gives the benefits that no special transport or hoisting equipment is needed.

The structure for storing one or more containers according to the invention comprises a deck and at least one bed for supporting at least one container along said container's lower surface and/or edges, where said structure is a concrete structure. By manufacturing said structure from concrete, a very robust and strong structure is achieved. At the same time the price can be held at a minimum compared to manufacturing the structure from steel that has to be painted and maintained on a regular basis to prevent the construction from corroding. Said one or more beds on the concrete structure can be made as simple as a flat area in the same level as the deck of the structure, but can also be made as either a cut out in the deck or as a footing that raises from the deck. No matter which solution is used a bed can be prepared for supporting a container along at least two edges at or near the bottom of a container. An advantage by having a bed with a footing is that water e.g. rainwater will be led to a level below the bed itself and thus away from a container on the bed. Such a footing can have a height of a few to several centimeters, e.g., between 5 to 50 centimeters.

In a preferred embodiment of an offshore wind turbine, according to the invention said concrete structure can be fixed to the tower via reinforcement bars or other structural parts on said tower or on said transition piece, where said reinforcement bars or other structural parts are extending from said tower or transition piece and into said concrete structure. The reinforcement bars can as an example consist of traditional steel rods welded to the tower and extending into the concrete structure. Also already existing flanges on the tower or transition piece can be used as a kind of anchor for the concrete structure. The structure can thus be molded around a flange or it can be resting on such a flange. A further possible solution for fixating a concrete structure to a tower is to have connecting flanges projecting from the concrete structure towards other connecting means on e.g. the tower, where these flanges and connection means are bolted or welded together.

In an embodiment of an offshore wind turbine, according to the invention said concrete structure can be arranged all the way around a wind turbine tower. By having the structure encircling the tower, a lot of the forces acting on the tower from the structure are leveled out as the structure becomes self carrying and only the load from the weight has to be transferred to the tower. Further the encircling structure will give the possibility to have a larger deck area for the containers, but also to have an access way for the personnel that needs to install and to service the containers and their content.

In a preferred embodiment of an offshore wind turbine according to the invention said concrete structure comprises two beds, said two beds being arranged opposite each other on the side of the wind turbine tower. In yet another preferred embodiment said beds are arranged right next to the sidewall of the tower. The beds on the concrete structure can be arranged with an equal distance, but a setup with three beds, where two of them are arranged in proximity and where the third is arranged at an opposite side of the structure, is also possible. This will allow a very dynamic setup, where specific containers are arranged on beds in a relative position according to the specific needs.

In an embodiment according to the invention, said concrete structure comprises one or more channels extending from one bed to the tower or from one bed to another bed, said one or more channels serving as installation channels for cables and/or other installations between two beds or between a bed and the tower. By having such channels made in the structure, a very easy and installation friendly solution is obtained as cables or the like easily can be arranged in said channels. The channels can be open channels in the surface of the beds and/or concrete structure, but can also be closed channels with an opening in the bed, where said opening is arranged at a corresponding opening in a container. In the same manner such channels can have an opening towards the tower and a corresponding opening in said tower, thereby allowing, e.g., cables to enter or exit the tower and the containers. One or more channels can also be arranged between the specific beds, and further channels can be made from the deck of the concrete structure or from one or more beds through the concrete structure and with an opening on the side of the structure facing towards the water surface. Said channels can have any direction inside the concrete structure, but a channel extending along the tower will be preferred for guiding and fixating a submarine cable along the tower.

In an embodiment according to the invention the concrete structure comprises at least one embedded electrical cable, said electrical cable being non-removable and fixed in the concrete and extending from the tower or from a container at a bed on said structure. By embedding one or several electrical cables in the concrete structure it becomes possible to transfer heat from said cables into the concrete structure. Cables running between the various components at a wind turbine transfers large amounts of energy and some of that energy will evidently be turned into heat. Because of this fact it is very common to arrange electrical cables with an internal distance and thus allowing the heat to escape by convection. It is however clear that such heat can be removed more efficiently by having a larger cooling surface—a large heat absorber. By embedding the electrical cables and other suitable components, in concrete, the concrete structure acts as a big heat absorber that transfers heat away from the cables and, e.g., from other embedded components.

As mentioned above it is possible to manufacture the concrete structure with embedded channels for electrical cables or other components to be installed in. Said channels can be narrow channels or ducts for only one single cable but they can also be made suitable for a number of cables. After having installed the components, these channels or ducts can be filled/flooded with some kind of heat conducting material e.g. concrete, glycol, thermal gel or paste, silicone heat transfer fluids or the like.

By filling and/or flooding the channels a more efficient transfer of heat from the cables and into the rather big concrete structure can be obtained, and by using the concrete structure as a big heat absorber the temperature of the cables can be controlled and kept at a attractive level.

In order to optimize handling of different parts and other goods, the concrete structure may further comprise a retractable and/or collapsible crane, and in a preferred embodiment of the invention the concrete structure also comprises a protective rail along at least a part of the edges of the deck, said protective rail being a safety rail preventing people from falling off the deck of the structure and into the water below. Such a rail can be fixated to the deck with suitable fasteners, which can be bolts, but which also can be a fixture that is embedded in the deck during casting of the concrete structure.

Further an offshore wind turbine according to the invention may have a concrete structure comprising a ladder extending from a level below the concrete structure through the concrete structure and to the deck of the concrete structure. Such a ladder will allow personnel to enter the deck of the structure and via this enter the inside of the tower and of one or more of the containers placed on the deck. The ladder can as an example extend from sea level to the deck of the concrete structure.

In a special embodiment of the invention, the concrete structure comprises a wave run-up deflector, said wave run-up deflector being constituted at least by the surface or surfaces of the concrete structure facing towards the water surface or away from the tower. As such a wave run-up deflector often can be useful, it seems to be a good idea to combine a structure for storing one or more containers on a deck with a run-up deflector. The surfaces of the concrete structure that is facing in an opposite direction of the deck will have a deflecting effect and various possible ways of shaping such surfaces will be discussed in the detailed description below and in the figures.

The invention further comprises a method of manufacturing a concrete structure for an offshore wind turbine according to the above described embodiments. Such a method comprises at least the following steps, where a mold is arranged around the tower, various inserts for, e.g., drain openings, for mounting a protective rail and/or for mounting a crane is placed in relation to the mold and to the tower or transition piece, form parts for creating installation channels in the structure are placed in relation to the mold and to the tower, concrete is poured into said mold, the concrete is left to set.

Using a method as mentioned above to manufacture a concrete structure as described will allow the structure to be manufactured on shore and preferably at a location in or near the harbor from where the parts will be shipped to the locations for installation. As a part of a tower is fitted with a mold, concrete can be poured into the mold. Before topping up the mold, various inserts can be added into the mold. This can be elements as pipes, ducts or channels for installing cables—the above mentioned channels, drain pipes or inserts for the protective rail for fixating a crane. Such inserts or embedded elements are easily installed before the concrete is poured and hardened.

A method according to the invention can further comprise at least a step, where one or more electrical cables are arranged in said mold prior to pouring concrete into said mold. Said electrical cables are then embedded in the concrete when poured, and will then be in full contact with the concrete structure, that efficiently will conduct heat from the embedded cables or components.

After arranging all necessary mold parts and other parts, such as inserts or channels, the concrete is left to harden and the concrete structure now only needs to be stripped from the molding parts.

An embodiment of the invention will now be described, by way of example only, with reference to the accompanying drawings, in which:

DETAILED DESCRIPTION OF THE INVENTION

In the following text, the figures will be described one by one and the different parts and positions seen in the figures will be numbered with the same numbers in the different figures. Not all parts and positions indicated in a specific figure will necessarily be discussed together with that figure.

Figure 1:
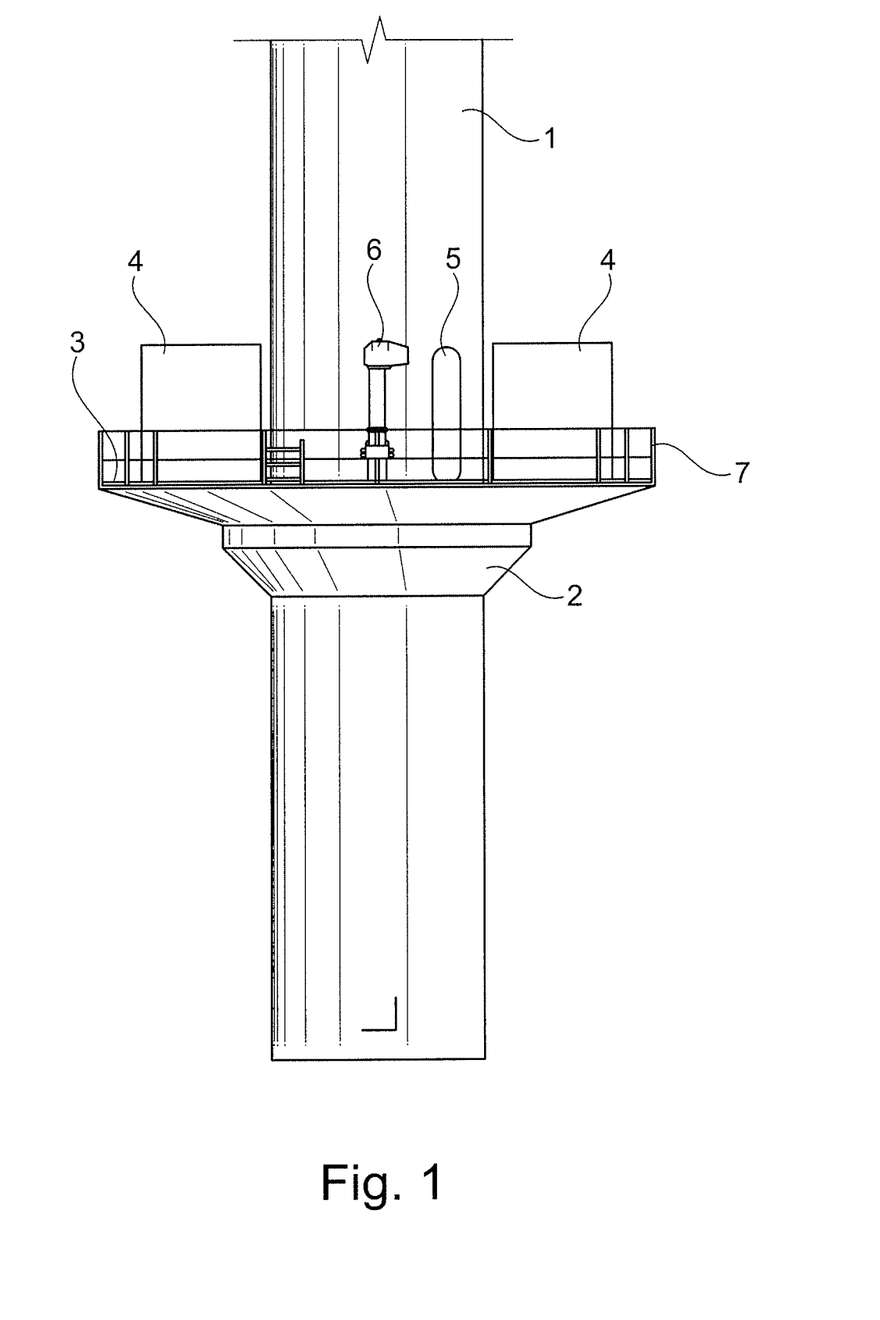
FIG. 1 shows a part of a wind turbine tower, with a structure with two containers.

In FIG. 1 a part of a wind turbine tower 1, with a concrete structure 2 is seen. On the deck 3 of said structure 2, two containers 4 are seen from the end and next to the sidewall of the tower 1. In the tower 1 there is a door 5 allowing service personnel to access the inside of the tower 1 and the rest of the components in the tower 1 and in the e.g. nacelle (not shown). On the deck 3 there is installed a crane 6 that can be used for hoisting parts to and from the deck 3 of the concrete structure 2. Further the concrete structure 2 is fitted with a surrounding safety rail 7, to prevent service personnel from falling of the structure 2.

Figure 2:
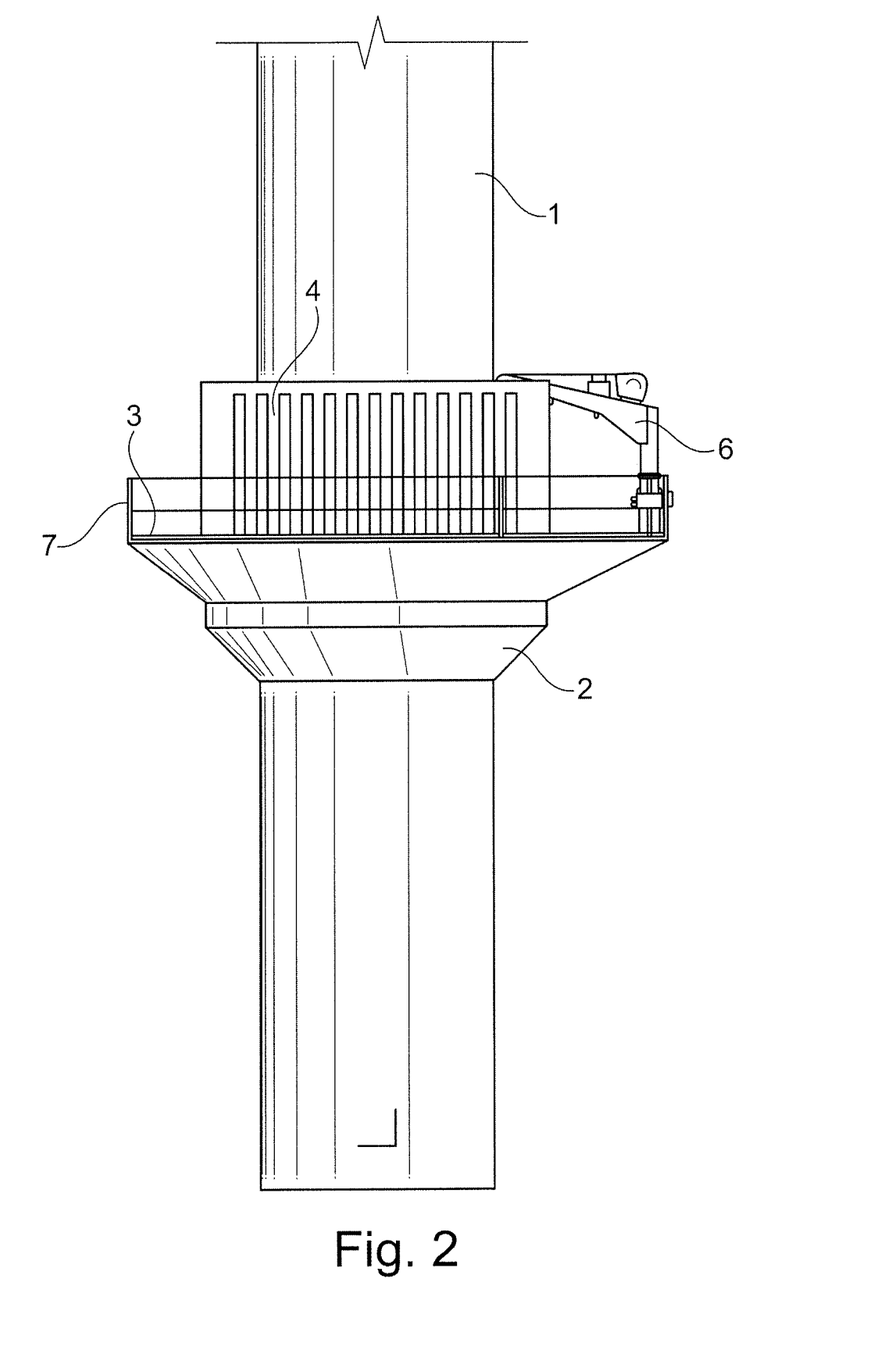
FIG. 2 shows the same as FIG. 1, but from another angle.
Figure 3:
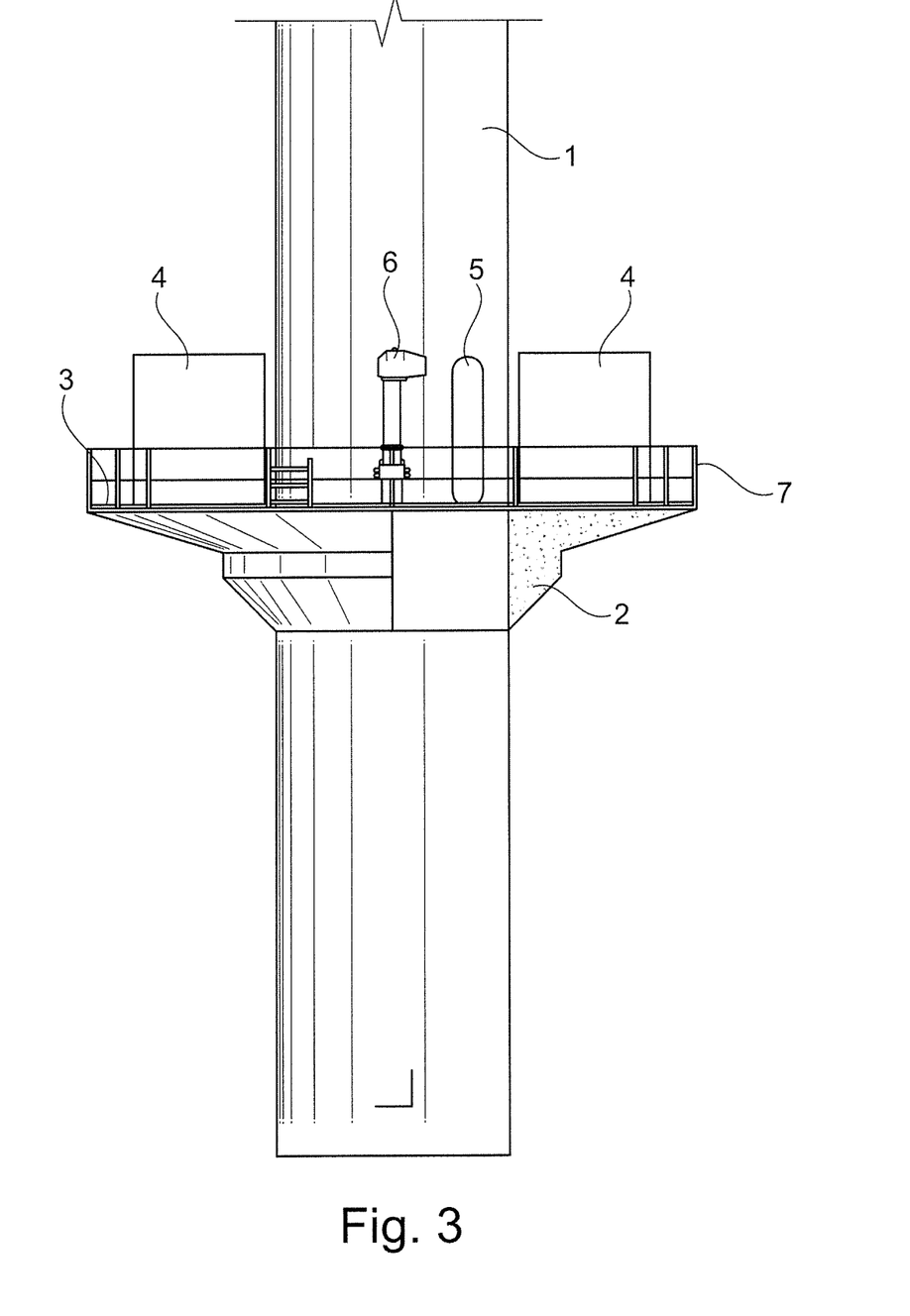
FIG. 3 shows the same as FIG. 1, but with a cut out in the structure.

In FIG. 2 the same elements as shown in FIG. 1 are seen, but from another angle, where the containers 4 are seen from the side. Further FIG. 3 also shows the same as FIG. 1, but with a cut-out in the structure 2 allowing us to see the outer contour of the solid concrete structure 2.

Figure 4:
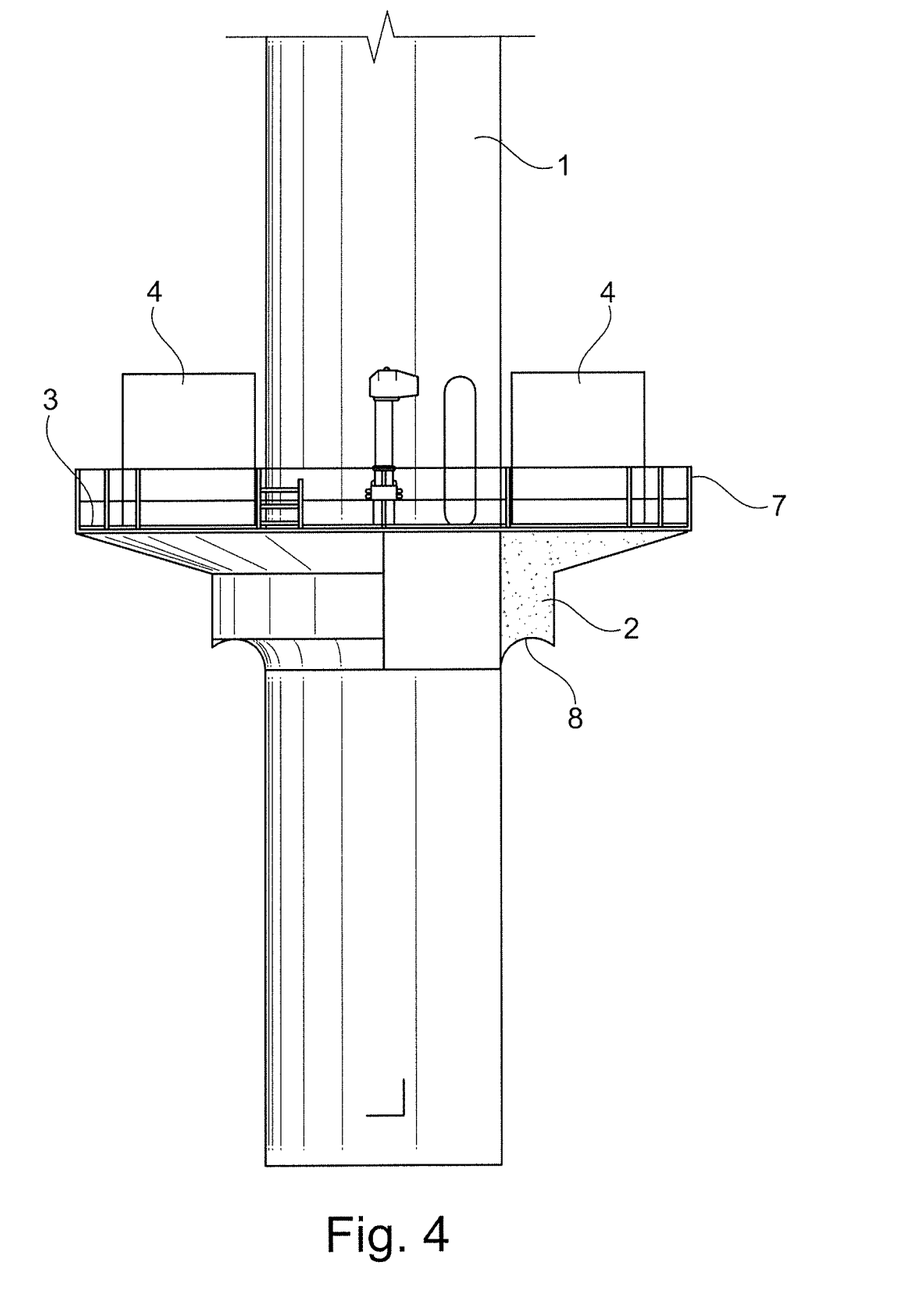
FIG. 4 shows a structure on a wind turbine tower with a wave run-up deflector.

FIG. 4 shows a concrete structure 2 on a wind turbine tower 1, with a wave run-up deflector 8 that due to the concave shape will deflect any waves that will run-up along the tower 1, whereby the containers 4 and also other parts of the wind turbine will be protected against the wave. The wave run-up deflector 8 is arranged all the way around the tower 1 and can be an integrated part of the concrete structure 2, but it can also be a separate part added to the tower 1 below the concrete structure 2, but fixated to said structure 2.

Figure 5:
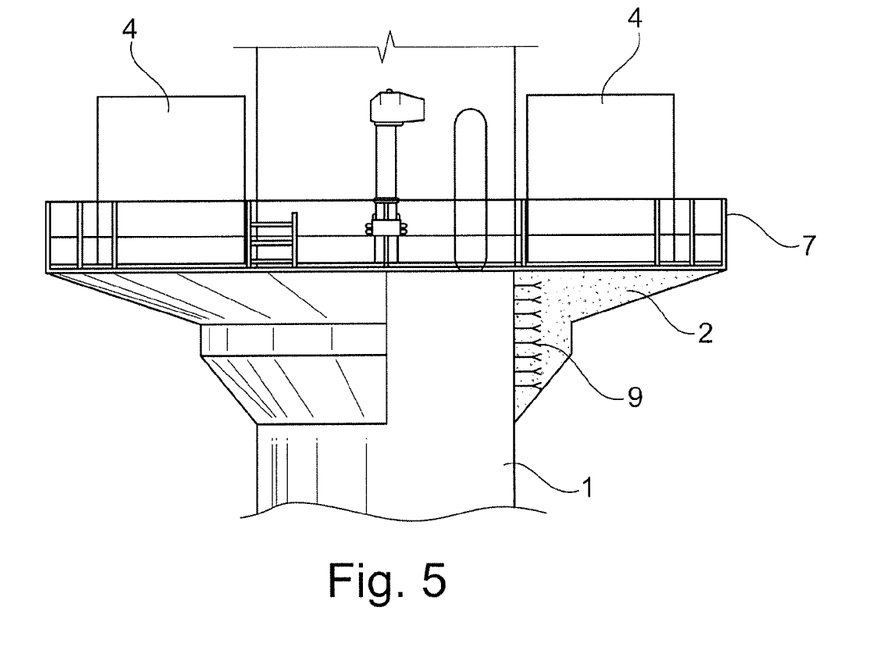
FIG. 5 shows a structure with a cut out and with fixating means in the concrete.

FIG. 5 shows a concrete structure 2 with a cut out, and with fixating means 9 in the concrete. Such fixating means 9 can be steel struts welded to the side of the tower 1 or it can be other types of structural parts fixed to the tower 1 and allowing the concrete structure 2 to be fixed and carried via these means 9.

Figure 6:
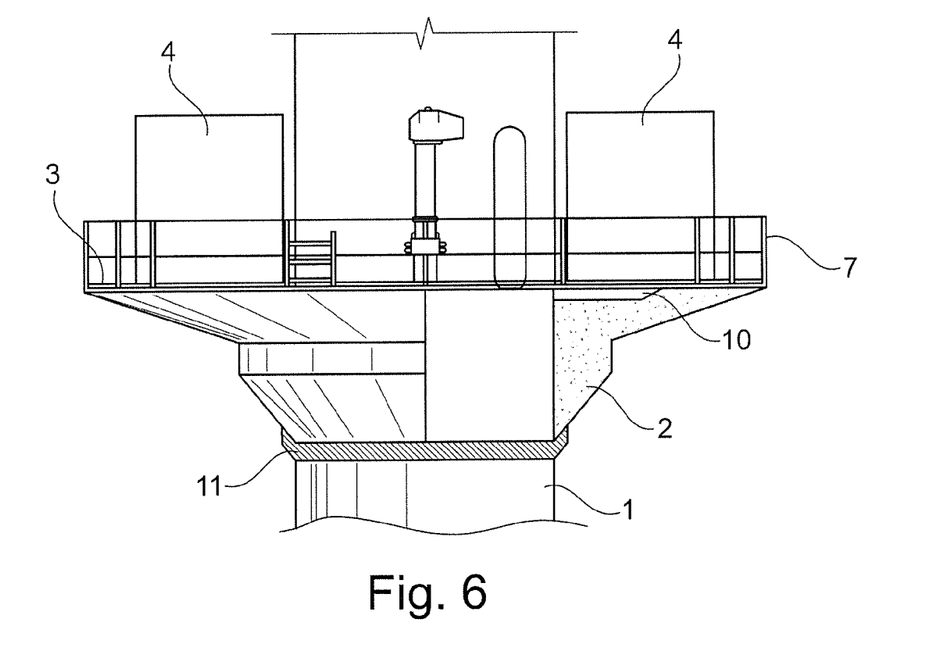
FIG. 6 shows a structure with an integrated channel, where the structure is resting on a flange around the tower.

FIG. 6 shows a concrete structure with an integrated channel 10 for installation of e.g. cables from a container 4 to the tower 1. In the shown embodiment the channel 10 is an open channel 10, but it could also be a channel 10 embedded in the concrete structure 2, and only having openings on specific locations, e.g., under the containers 4 and where the channel 10 faces the tower 1. In this figure the concrete structure 2 is resting on a flange 11 around the tower 1. This allows the concrete structure 2 to be manufactured in a separate mold and installed on a tower 1, either before shipping the tower 1 or after installing the tower 1 at e.g. a monopile foundation offshore. The flange 11 can be a steel flange 11 welded and/or bolted onto the tower 1.

Figure 7:
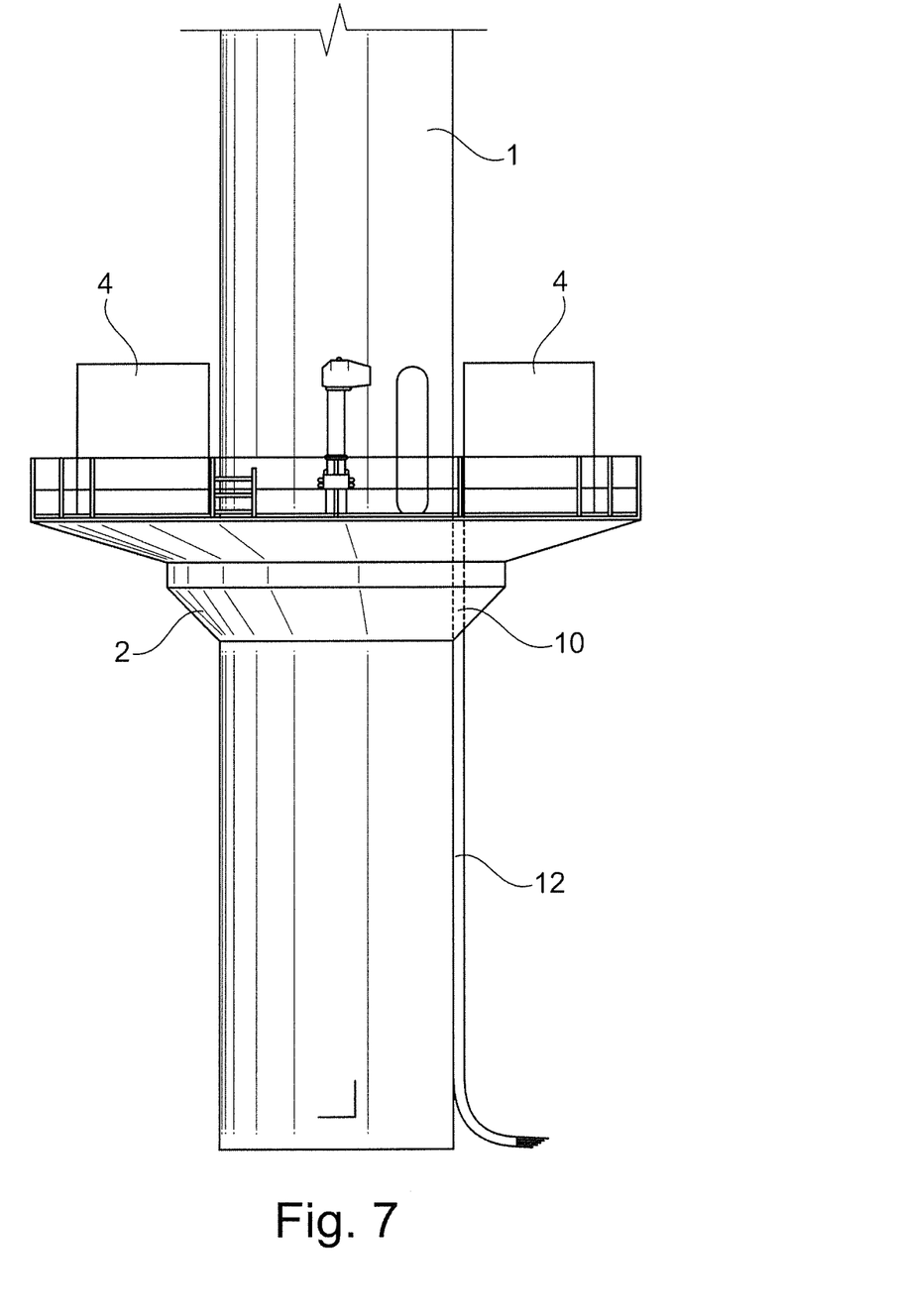
FIG. 7 shows a part of a wind turbine tower, with a structure with two containers and with a submarine cable extending along the side of the tower.

FIG. 7 shows a part of a wind turbine tower 1 with a concrete structure 2 with two containers 4 and with a submarine cable 12 extending along the side of the tower 1. The submarine cable 12 is extending from a container 4 or from the inside of the tower 1, through the concrete structure 2 in a channel 10 and towards the seabed, and further the submarine cable typically extends towards another wind turbine or towards the shore.

Figure 8:
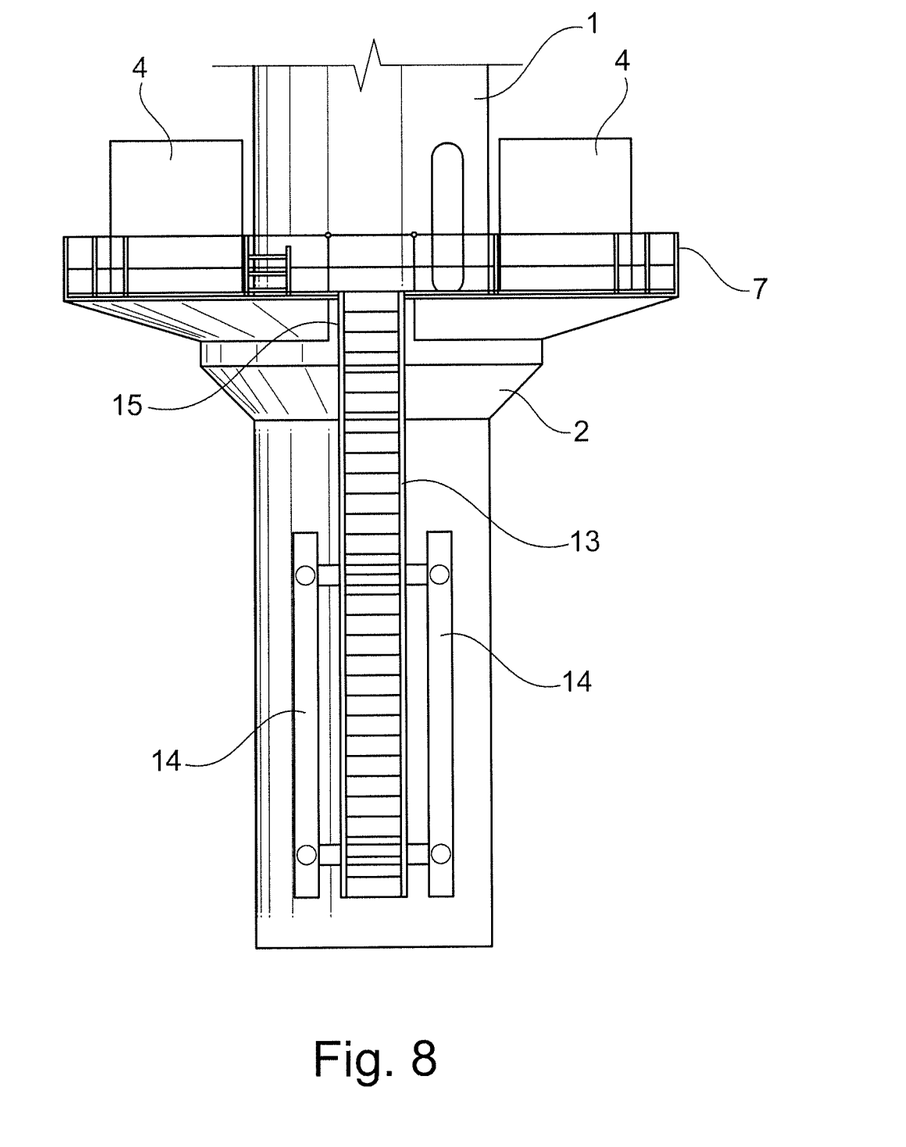
FIG. 8 shows a structure on a tower and a ladder and docking means extending along the tower.

FIG. 8 shows a concrete structure 2 on a tower 1, where a ladder 13 and docking means 14 are extending along the tower 1. In this figure the ladder 13 is arranged in an open cut out 15 in the concrete structure 2. The ladder 13 could easily be installed in a manhole in the concrete structure 2. The docking means 14 are of the known type and allow a ship to dock while service personnel enter the ladder 13.

Figure 9:
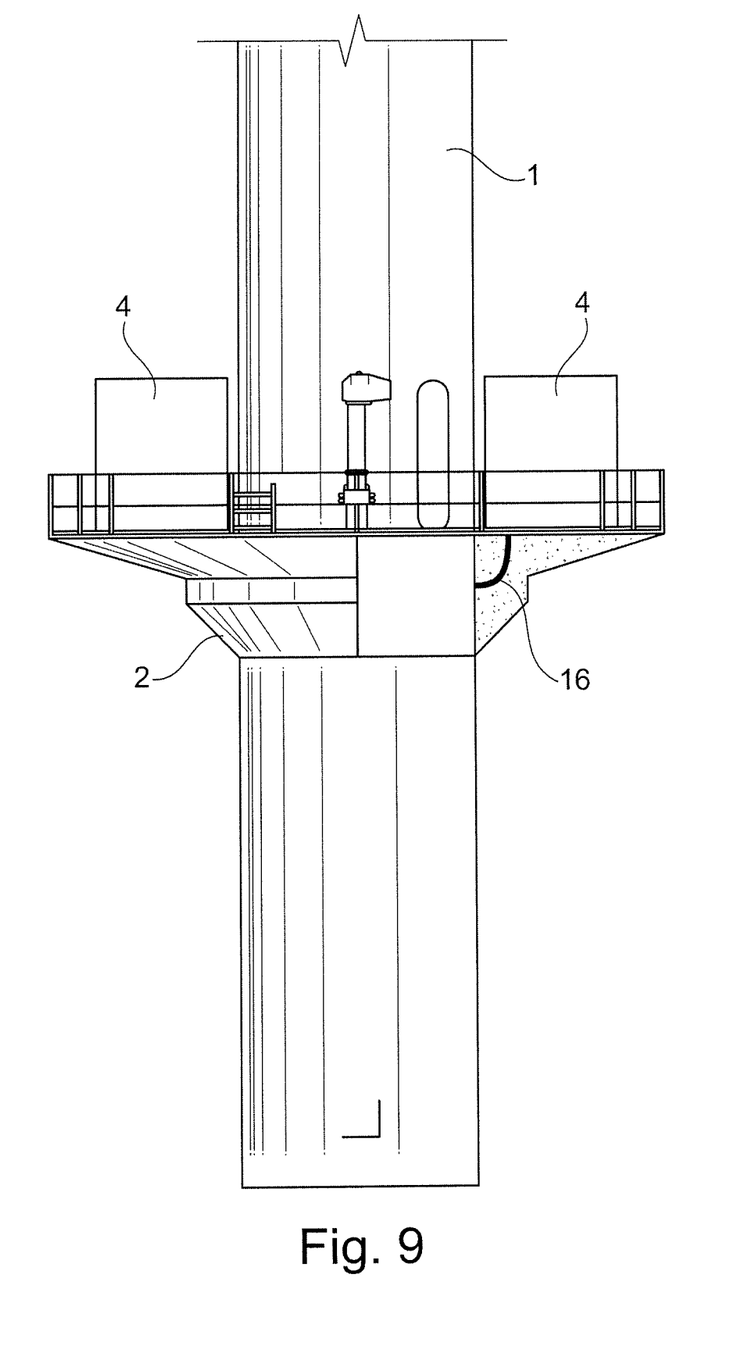
FIG. 9 shows a structure on a tower, but with a cut out in the structure where an embedded cable is seen.

Further and finally FIG. 9 shows a concrete structure 2 on a tower 1 for a wind turbine, but with a cut-out in the structure 2 allowing us to see the outer contour of the solid concrete structure 2. Embedded in said concrete structure 2 is seen a electrical cable 16 that is arranged in a manner that allows the end of said cable 16 to project in a vertical direction towards the bottom of the container 4. Such a cable can be extending from one container 4 to another container 4 but can also extend from one container 4 and to the tower 1 or towards the seabed as the cables 12 seen in FIG. 7. One very important advantage with the cables 16 embedded into the concrete structure is that heat can be conducted away from said cable 16 but also the possibility to have a rather big bending radius on the cables 16 are attractive. By embedding the cable or cables a radius of e.g. two meters or more can be obtained and the container 4 can be placed directly onto the cable/cables 16 for internal installation inside the container 4.

The invention is not limited to the embodiments described herein, and may be modified or adapted without departing from the scope of the present invention as described in the patent claims below.

What is claimed is:

1. Method of manufacturing a concrete structure for an offshore wind turbine, said wind turbine comprising a wind turbine tower, where a nacelle is arranged on top of said wind turbine tower, said nacelle comprising a rotor with at least two rotor blades, said wind turbine further comprising subsystems for controlling the wind turbine for converting and transforming the power generated by the wind turbine and for connecting the wind turbine to the overall electrical grid, said wind turbine tower being connected to a transition piece or a foundation at a lower end, said connection being at a position above sea level, where said wind turbine at a level above sea level comprises at least one structure for storing at least one container, each container having the size and measures of a standard container and containing at least some of said subsystems for converting and transforming power generated by the wind turbine, where said structure is arranged on the side of the wind turbine tower and wherein said method comprises at least the following steps:
 a mold is arranged around the wind turbine tower,
 various inserts for at least one of drain openings, a protective rail mounting and a crane mounting placed in relation to the mold and to the wind turbine tower or transition piece,
 form parts for creating installation channels in the structure are placed in relation to the mold and to the wind turbine tower,
 concrete is poured into said mold,
 the concrete is left to set.

2. Method according to claim 1 wherein said method further comprises at least the following steps, where one or more electrical cables are arranged in said mold prior to pouring concrete into said mold.

3. Method according to claim 1 wherein the molding of said concrete structure takes place onshore and prior to transporting the structure to its erection location.

4. An offshore wind turbine comprising a wind turbine tower, where a nacelle is arranged on top of said wind turbine tower, said nacelle comprising a rotor with at least two rotor blades, said wind turbine further comprising subsystems for controlling the wind turbine for converting and transforming the power generated by the wind turbine and for connecting the wind turbine to the overall electrical grid, said wind turbine tower being connected to a transition piece or a foundation at a lower end, said connection being at a position above sea level, where said wind turbine at a level above sea level comprises at least one structure for storing at least one container, each container having the size and measures of a standard container and containing at least some of said subsystems for converting and transforming power generated by the wind turbine, where said structure is arranged on the side of the wind turbine tower, wherein said structure for storing the at least one container comprises a deck and at least one bed for supporting the at least one container along each container's lower surface and/or edges, where said structure is a concrete structure, and wherein said concrete structure comprises one or more channels extending from the at least one bed to the wind turbine tower or from the at least one bed to another bed, said one or more channels serving as installation channels for cables and/or other installations between two beds or between the at least one bed and the wind turbine tower.

5. An offshore wind turbine according to claim 4 wherein said concrete structure is fixed to the wind turbine tower via reinforcement bars or other structural parts on said wind turbine tower, where said reinforcement bars or other structural parts are extending from said wind turbine tower and into said concrete structure.

6. An offshore wind turbine according to claim 4 wherein said concrete structure is arranged all the way around the wind turbine tower.

7. An offshore wind turbine according to claim 4 wherein said concrete structure comprises two beds, said two beds being arranged opposite each other on a side of the wind turbine tower.

8. An offshore wind turbine according to claim 7 wherein each bed is arranged right next to a sidewall of the wind turbine tower.

9. An offshore wind turbine according to claim 4 wherein the concrete structure comprises at least one embedded electrical cable, each electrical cable being non-removable and fixated in the concrete and extending from the wind turbine tower or from the at least one container at the at least one bed on said concrete structure.

10. An offshore wind turbine according to claim 4 wherein the concrete structure further comprises a retractable and/or collapsible crane.

11. An offshore wind turbine according to claim 4 wherein the concrete structure comprises a protective rail along at least a part of edges of the deck.

12. An offshore wind turbine according to claim 4 wherein the concrete structure comprises a ladder extending from a level below the concrete structure, through the concrete structure and to the deck of the concrete structure.

13. An offshore wind turbine according to claim 4 wherein the concrete structure comprises a wave run-up deflector, said wave run-up deflector being constituted at least by the surface or surfaces of the concrete structure facing towards the water surface or away from the wind turbine tower.

* * * * *